US009563346B2

(12) United States Patent
Shen

(10) Patent No.: US 9,563,346 B2
(45) Date of Patent: Feb. 7, 2017

(54) METHOD FOR SCROLLING A DISPLAYED IMAGE IN A TOUCH SYSTEM

(71) Applicants: Inventec (Pudong) Technology Corp., Shanghai (CN); Inventec Corporation, Taipei (TW)

(72) Inventor: Jinbei Shen, Shanghai (CN)

(73) Assignees: Inventec (Pudong) Technology Corp., Shanghai (CN); Inventec Corporation, Taipei (TW)

( * ) Notice: Subject to any disclaimer, the term of this patent is extended or adjusted under 35 U.S.C. 154(b) by 261 days.

(21) Appl. No.: 14/571,300

(22) Filed: Dec. 16, 2014

(65) Prior Publication Data

US 2016/0070428 A1    Mar. 10, 2016

(30) Foreign Application Priority Data

Sep. 4, 2014  (CN) .......................... 2014 1 0447015

(51) Int. Cl.
*G06F 3/048* (2013.01)
*G06F 3/0485* (2013.01)
*G06F 3/0488* (2013.01)

(52) U.S. Cl.
CPC ......... *G06F 3/0485* (2013.01); *G06F 3/04883* (2013.01); *G06F 2203/04808* (2013.01)

(58) Field of Classification Search
CPC .................................................... G06F 3/0485
USPC ........................................................ 715/784
See application file for complete search history.

(56) References Cited

U.S. PATENT DOCUMENTS

| 8,305,356 B1* | 11/2012 | Jang ...................... G06F 3/0485 345/173 |
| 2010/0149097 A1* | 6/2010 | Jung .................... G06F 3/03547 345/166 |
| 2012/0124468 A1* | 5/2012 | Tsai ...................... G06F 3/0488 715/702 |
| 2012/0210270 A1* | 8/2012 | Kwon .................. G06F 3/0485 715/777 |
| 2012/0235912 A1* | 9/2012 | Laubach ............. G06F 3/04895 345/163 |
| 2012/0280922 A1* | 11/2012 | Lee ...................... G06F 3/04847 345/173 |
| 2013/0201092 A1* | 8/2013 | Prakash ................ G06F 3/0483 345/156 |
| 2014/0101619 A1* | 4/2014 | Kaldor .................. G06F 3/0418 715/863 |
| 2015/0205476 A1* | 7/2015 | Kuscher ................ G06F 3/0485 715/784 |

* cited by examiner

*Primary Examiner* — William Titcomb
(74) *Attorney, Agent, or Firm* — Winston Hsu; Scott Margo

(57) ABSTRACT

After receiving at least one touch point on a touch screen, detect at least one initial position of the touch point on the touch screen. When the touch point slides away from the initial position, scroll an image displayed on the touch screen according to at least one sliding action of the touch point. Then detect the number of the touch points on the touch screen, and update a scrolling rate of the image displayed on the touch screen according to the number of the touch points moving on the touch screen. The scrolling rate of the image is directly proportional to the number of the touch points moving on the touch screen.

10 Claims, 4 Drawing Sheets

METHOD FOR SCROLLING A DISPLAYED IMAGE IN A TOUCH SYSTEM

BACKGROUND OF THE INVENTION

1. Field of the Invention

The present invention illustrates a touch system, and more particularly to a method for scrolling a displayed image in a touch system.

2. Description of the Prior Art

With the advancement of communications and techniques, various of portable electronic devices are used in daily life, such as notebook, smart phone, tablet, etc. For convenience, these portable electronic devices usually use a user-interface for receiving the commands from users. The user-interface can be built in the touch screen. When a touch screen receives a touch signal from a user, an electronic device performs corresponding operations. For example, the user can scroll through the telephone directory to search for a contact person in the smart phone.

Conventionally, scrolling through the image displayed on the touch screen can be done in two different ways. The first way is to slide a finger or a stylus on the image. The second way is to control a scroll bar on one side of the image to scroll the image. When a file contains many pages of content, the touch screen can only display a small amount of content on the image. In this case, the first way would spend a lot of time to scroll through the file. The second approach would simply compress the scroll icon in the scroll bar to a very thin icon, making control of the scroll icon difficult and being unable to locate the file to an appropriate page. As a result, the efficient of reading or browsing data on the touch screen is reduced.

Thus, it is important to develop an efficient method for scrolling an image on the touch screen.

SUMMARY OF THE INVENTION

In an embodiment of the present invention, a method for scrolling the display image in a touch system is disclosed. The touch system includes a touch screen and a processor. The method includes receiving at least one touch point on the touch screen, detecting at least one initial position of the touch point on the touch screen, when the touch point is slid away from the initial position, scrolling an image displayed on the touch screen according to a sliding action of the touch point, detecting the number of the touch points on the touch screen, and updating a scrolling rate of the image displayed on the touch screen by the processor according to the number of the touch points moving on the touch screen, wherein the scrolling rate of the image is directly proportional to the number of the touch points moving on the touch screen.

In another embodiment of the present invention, a touch system is disclosed. The touch system includes a touch screen for displaying an image, a processor coupled to the touch screen for receiving at least one touch point on the touch screen, and a detecting module coupled to the processor for detecting the initial position of the touch point and number of the touch points on the touch screen, wherein when the touch point is slid away from the initial position, the processor scrolls the image displayed on the touch screen according to sliding action of the touch point, and updates a scrolling rate of the image displayed on the touch screen according to the number of the touch points moving on the touch screen, wherein the scrolling rate of the image is directly proportional to the number of the touch points moving on the touch screen.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
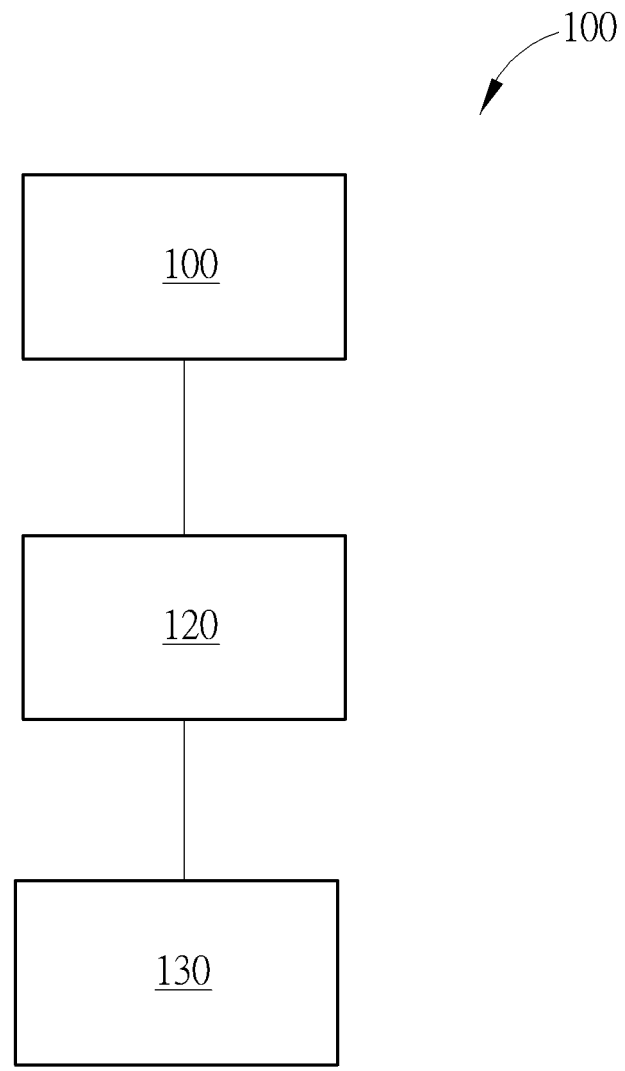
FIG. 1 is a schematic block diagram of touch system according to the embodiment of the present invention.

FIG. 1 is a schematic block diagram of a touch system 100 according to the embodiment of the present invention. As shown in FIG. 1, the touch system 100 includes a touch screen 110, a processor 120 and a detecting module 130. The touch screen 110 is used for displaying an image. The processor 120 is coupled to the touch screen 110 for receiving at least one touch point on the touch screen 110. The detecting module 130 is coupled to the processor 120 for detecting at least one initial position of the touch point and the number of the touch points on the touch screen 110. In the touch system 100, the touch screen 110 can display the image and has the capability of receiving multi-touch inputs. It means that the touch screen 110 can receive at least one touch point. The processor 120 updates a scrolling rate of the image displayed on the touch screen 110 according to the number of the touch points sliding on the touch screen 110. The detail description of how to update a scrolling rate of the image displayed on the touch screen 110 is illustrated below.

Figure 2:
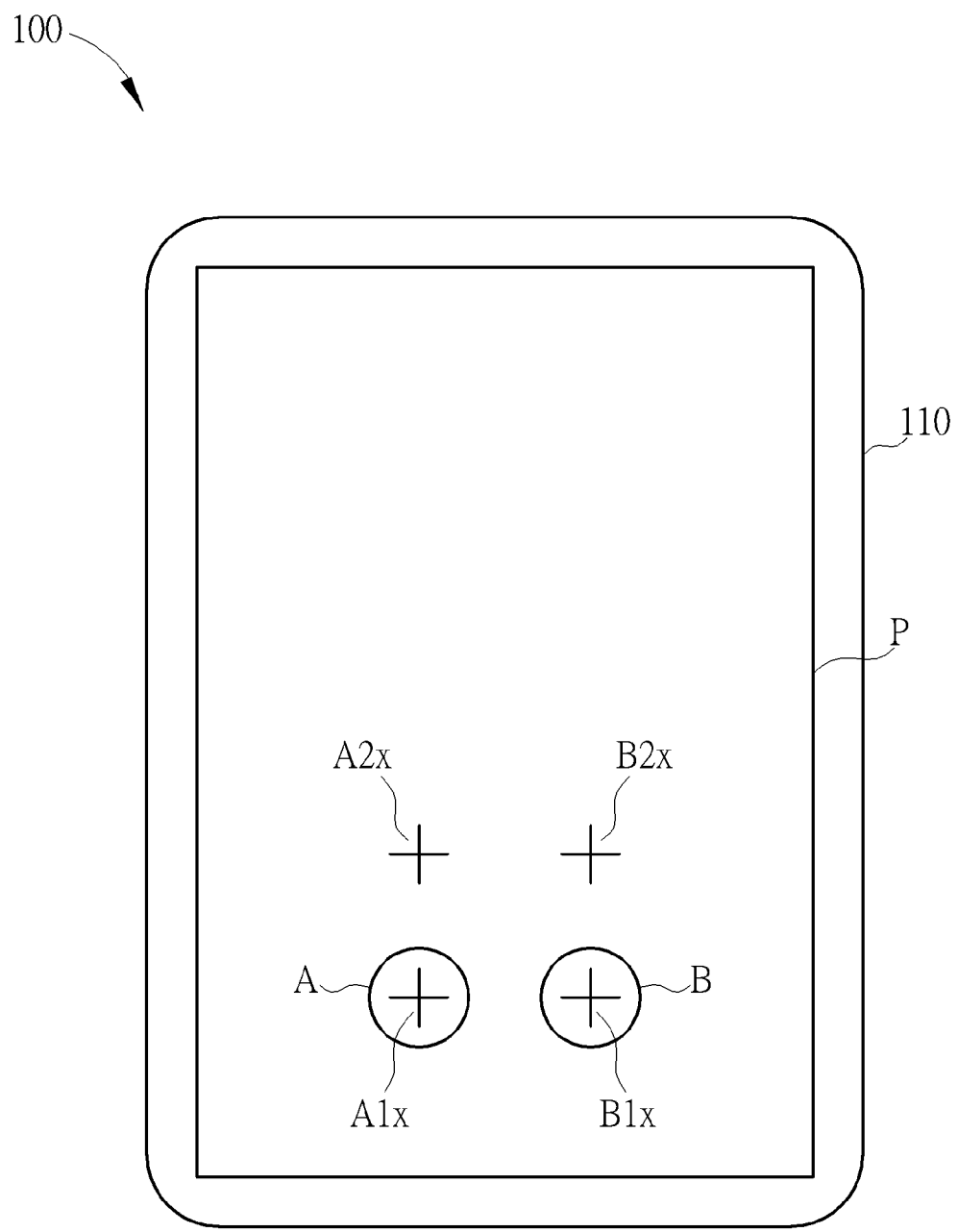
FIG. 2 illustrates the method for scrolling the display image of touch system in FIG. 1 according to the embodiment of the present invention.

FIG. 2 illustrates a method for scrolling the display image of the touch system 100 in FIG. 1 according to the embodiment of the present invention. As shown in FIG. 2, the touch screen 110 displays an image P. Two touch points on the touch screen 110 are considered as touch point A and touch point B. These touch points can be triggered by using the fingers or styluses on the touch screen 110. The following example illustrates how to update the scrolling rate of the image P in touch system 100 according to touch inputs. Initially, when a user only uses one finger or one stylus to touch the touch screen 110 (i.e., touch point A or touch point B is received), the scrolling rate of the image P is equal to a predetermined speed. When the user uses two fingers to touch the touch screen 110 on the touch point A and touch point B to scroll the image P, touch point A and touch point B are received by the processor 120 through the touch screen 110. Then, the detecting module 130 respectively detects the initial positions of touch point A and touch point B and the corresponding coordinates denoted as $A1x$ and $B1x$. When the user scrolls down the image P by respectively sliding the touch point A and touch point B from the coordinates $A1x$ and $B1x$ to the coordinates $A2x$ and $B2x$, the detecting module 130 transmits the moving data of touch point A and touch point B to the processor 120. When the processor 120 receives the moving data of touch point A and touch point B, the processor 120 determines that the user performs a scrolling down operation of the image P. At this moment, the detecting module 130 detects the number of touch points on the touch screen 110 (i.e., here, the number of touch points on the touch screen 110 is equal to 2). In the following, the processor 120 updates a scrolling rate of the image P displayed on the touch screen 110 according to the number of touch points moving on the touch screen 110. In the embodiment, since touch point A and touch point B are moving on the touch screen 110, the processor 120 updates the scrolling rate of the image P from the predetermined speed to 2 times the predetermined speed. However, the method for scrolling the image P is not limited by 2 touch points. In another embodiment, when the user uses 3 touch points to the touch screen 110 and these 3 touch points are moving on the touch screen 110, the processor 120 updates the scrolling rate of the image P from the predetermined speed to 3 times the predetermined speed. And so on, when the user uses N touch points to the touch screen 110 and these N touch points are moving on the touch screen 110, the processor 120 updates the scrolling rate of the image P from the predetermined speed to N times the predetermined speed, wherein N is a positive integer. Thus, in the present invention, the scrolling rate of the image P is directly proportional to the number of touch points moving on the touch screen 110.

Figure 3:
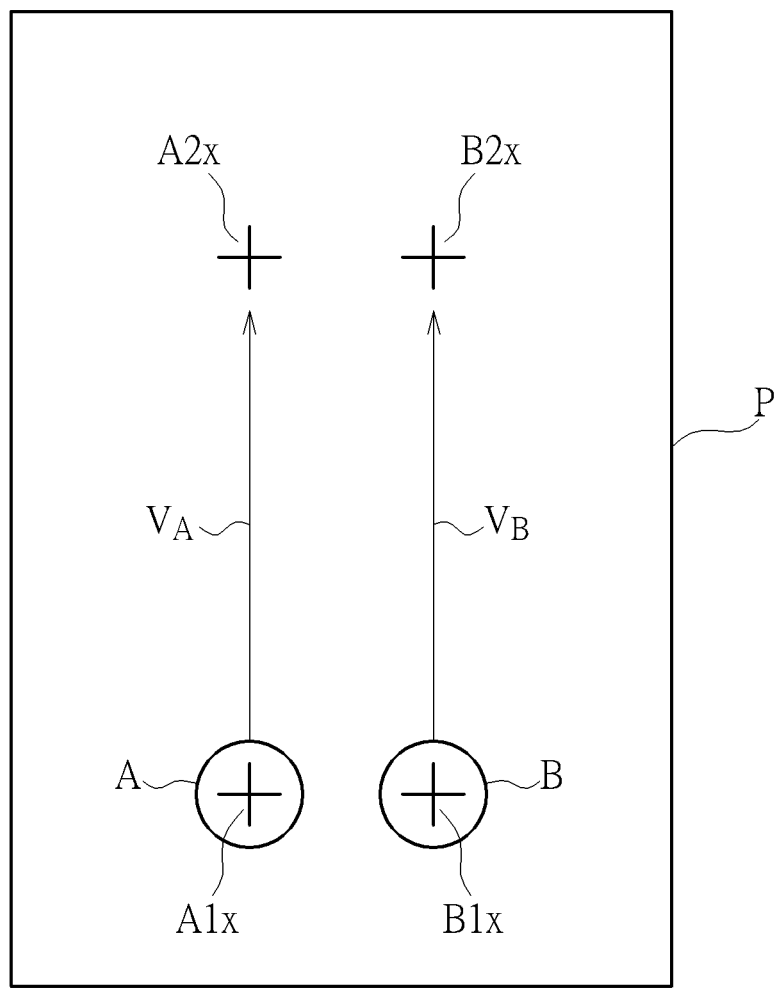
FIG. 3 is the illustrations of touch points being slid in consistent direction of touch system in FIG. 1 according to the embodiment of the present invention.

The correlation of the directions of at least two touch points and the direction of scrolling the image P by the processor 120 is illustrated in the following. As shown in FIG. 3, it is assumed that touch points A and B are respectively slid away from the first coordinates A1x and B1x to the second coordinates A2x and B2x. Touch point A is slid away from the first coordinate A1x to the second coordinate A2x with respect to a direction vector $V_A$. Touch point B is slid away from the first coordinate B1x to the second coordinate B2x with respect to a direction vector $V_B$. When the direction vector $V_A$ and direction vector $V_B$ are in parallel or are almost in parallel (i.e., it means that direction vector $V_A$ and direction vector $V_B$ are in consistent directions), the processor 120 determines that the user performs a scrolling operation of the image P. The processor 120 scrolls the image P displayed on the touch screen 110 in the same direction along the direction vector $V_A$ and direction vector $V_B$. However, the embodiment of the present invention is not limited by using two moving touch points. In another embodiment, when at least two touch points are slid away from the initial positions and the moving directions of the touch points are consistent, the processor 120 scrolls the image P displayed on the touch screen 110 in the same direction of the touch points being slid away. When N touch points are slid away from the initial positions and the moving directions of N touch points are consistent, the processor 120 scrolls the image P displayed on the touch screen 110 in the same direction of N touch points being slid away.

Figure 4:
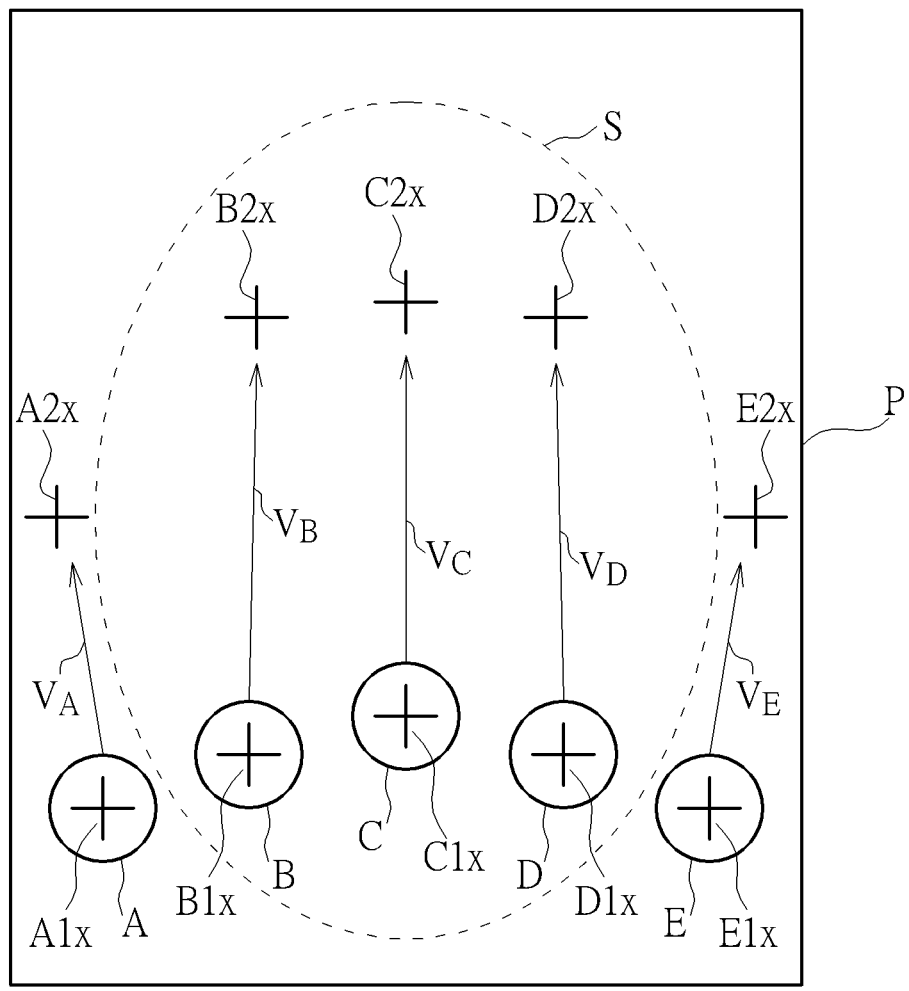
FIG. 4 is the illustrations of touch points being slid in inconsistent direction of touch system in FIG. 1 according to the embodiment of the present invention.

Here, another correlation of the directions of at least two touch points and the direction of scrolling the image P by the processor 120 is illustrated in the following. As shown in FIG. 4, 5 touch points are depicted as touch point A to touch point E (i.e., 5 touch points can be triggered by 5 fingers of user). Touch point A to touch point E are respectively slid away from initial positions (the first coordinates A1x, B1x, C1x, D1x, and E1x) to the second coordinates A2x, B2x, C2x, D2x, and E2x. Touch point A is slid away from the first coordinate A1x to the second coordinate A2x with respect to a direction vector $V_A$. Touch point B is slid away from the first coordinate B1x to the second coordinate B2x with respect to a direction vector $V_B$. Touch point C is slid away from the first coordinate C1x to the second coordinate C2x with respect to a direction vector $V_C$. Touch point D is slid away from the first coordinate D1x to the second coordinate D2x with respect to a direction vector $V_D$. Touch point E is slid away from the first coordinate E1x to the second coordinate E2x with respect to a direction vector $V_E$. However, the directions among direction vector $V_A$ to direction vector $V_E$ are inconsistent. At this moment, the processor 120 analyzes the direction vector $V_A$ to direction vector $V_E$ and acquires a sliding trend in each touch point. Then, the processor 120 generates an average sliding direction from the directions along the sliding trends in all touch points (i.e., touch point A to touch point E). Specifically, generating the average sliding direction is not limited by using a specific or certain equation. For example, the first method for generating the average sliding direction is to evaluate the average direction value among direction vector $V_A$ to direction vector $V_E$. The second method for generating the average sliding direction is to determine a set S from touch point A to touch point E, wherein the set S includes the touch point B, touch point C, and touch point D having consistent directions. After determining the set S, the average sliding direction can be generated by evaluating the average direction value among direction vector $V_B$ to direction vector $V_D$ (i.e., within set S). The second method for generating the average sliding direction eliminates extreme values of direction of touch points and thus yields higher accuracy than the first method. In FIG. 4, touch point A and touch point E may be biased touch points, thus touch point A and touch point E are excluded in the calculation of the average sliding direction in the second method. If the processor 120 generates an average sliding direction from the directions along the sliding trends in all touch points (i.e., touch point A to touch point E), the direction of scrolling the image P may not be so accurate. Thus, the effect of the extreme sliding direction values of touch point A and touch point E can be avoided. Then, the processor 120 scrolls the image P displayed on the touch screen 110 in the average sliding direction of set S.

In the touch system 100 of the present invention, the processor 120 can scroll the image P displayed on the touch screen 110 along the direction of the touch points being slid away. The processor 120 can also scroll the image P in a horizontal direction or vertical direction which is consistent with the direction of scrolling bar. In the latter case, the image P is scrolled in the fixed four directions (i.e., up direction, down direction, left direction, and right direction). In other words, the methods for scrolling the display image P in the touch system 100 can be chosen by the user. The first method for scrolling the image P is to scroll the image P in a fixed horizontal direction or a fixed vertical direction. The second method for scrolling the image P is to scroll the image P in a non-fixed direction, and the non-fixed direction is consistent to the direction (or average direction) along the touch points being slid away. For example, when the image P is scrolled in a fixed horizontal direction or a fixed vertical direction, in FIG. 4, the processor 120 analyzes the direction vector $V_A$ to direction vector $V_E$ and then evaluates the average value among the direction vector $V_A$ to direction vector $V_E$ as the average sliding direction. Further, the processor 120 compares the average sliding direction with the fixed four directions (i.e., up direction, down direction, left direction, and right direction) and evaluates four values of direction difference (four angles). Then, the processor 120 selects a fixed direction from the fixed four directions with the minimum direction difference (angle). For example, the average sliding direction is compared with the up direction, down direction, left direction, and right direction. If the direction difference (angle) between the average sliding direction and the down direction is minimized, the image P is scrolled in the down direction according to the touch point A to touch point E moving on the touch screen 110.

To sum up, the present invention illustrates a touch system and method for scrolling the display image. The idea is that the scrolling rate of the image is directly proportional to the number of touch points moving on the touch screen. When the user browses a data which having very long displayed length, the touch system can adjust the scrolling rate of the image to an appropriate speed. Thus, the efficient of reading or browsing data on the touch screen can be improved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for scrolling a displayed image in a touch system, the touch system comprising a touch screen and a processor, the method comprising:
   receiving at least one touch point from the touch screen;
   detecting at least one initial position of the touch point on the touch screen;
   when the touch point is slid away from the initial position, scrolling an image displayed on the touch screen according to a sliding action of the touch point;
   detecting the number of the touch points on the touch screen; and
   updating a scrolling rate of the image displayed on the touch screen by the processor according to the number of the touch points moving on the touch screen;
   wherein the scrolling rate of the image is directly proportional to the number of the touch points moving on the touch screen.

2. The method of claim 1, wherein if N touch points are slid away from initial positions at the same time, the processor updates the scrolling rate of the image from one predetermined speed to the N times predetermined speed, wherein N is a positive integer.

3. The method of claim 1, wherein when at least two touch points are slid away from initial positions in a consistent direction, the processor scrolls the image in the direction along the touch points being slid.

4. The method of claim 1, wherein when at least two touch points are slid away from the initial positions in inconsistent directions, the processor analyzes the sliding directions of the touch points, and generates an average sliding direction from the directions along the touch points being slid, the processor scrolls the image displayed on the touch screen along the average sliding direction.

5. The method of claim 1, wherein the image displayed on the touch screen is scrolled according to sliding action of the touch point, and the image is scrolled along a horizontal direction or a vertical direction.

6. A touch system comprising:
   a touch screen for displaying an image;
   a processor coupled to the touch screen for receiving at least one touch point from the touch screen; and
   a detecting module coupled to the processor for detecting the initial position of the touch point and the number of the touch points on the touch screen;
   when the touch point is slid away from the initial position, the processor scrolls the image displayed on the touch screen according to sliding action of the touch point, and updates a scrolling rate of the image displayed on the touch screen according to the number of the touch points moving on the touch screen, wherein the scrolling rate of the image is directly proportional to the number of the touch points moving on the touch screen.

7. The system of claim 6, wherein after the processor receives N touch points on the touch screen, the detecting module detects the initial positions of the N touch points on the touch screen, if the N touch points are slid away from the initial positions at the same time, the processor updates the scrolling rate of the image from one predetermined speed to the N times predetermined speed, wherein N is a positive integer.

8. The system of claim 6, wherein when at least two touch points are slid away from initial positions in a consistent direction, the processor scrolls the image in the direction along the touch points sliding.

9. The system of claim 6, wherein when at least two touch points are slid away from the initial positions in inconsistent directions, the processor analyzes the sliding directions of the touch points, and generates an average sliding direction from the directions along which the touch points being slid, the processor scrolls the image displayed on the touch screen along the average sliding direction.

10. The system of claim 6, wherein the image displayed on the touch screen is scrolled according to sliding action of the touch point, and the image is scrolled along a horizontal direction or a vertical direction.

* * * * *